United States Patent
Kodama et al.

(10) Patent No.: US 8,941,844 B2
(45) Date of Patent: Jan. 27, 2015

(54) IMAGE PROCESSING APPARATUS AND IMAGE PROCESSING METHOD FOR SUPPRESSING IMAGE DEGRADATION CAUSED BY A PRINTING POSITION FLUCTUATION

(71) Applicant: Canon Kabushiki Kaisha, Tokyo (JP)

(72) Inventors: Shigeo Kodama, Tokyo (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/670,751

(22) Filed: Nov. 7, 2012

(65) Prior Publication Data

US 2013/0135642 A1 May 30, 2013

(30) Foreign Application Priority Data

Nov. 25, 2011 (JP) ................... 2011-258287

(51) Int. Cl.
*G06K 15/00* (2006.01)
*G06T 5/00* (2006.01)

(52) U.S. Cl.
USPC .................................. 358/1.12; 358/3.26

(58) Field of Classification Search
USPC ............... 358/1.2, 1.9, 1.12, 1.14, 1.15, 3.26, 358/474, 505, 496, 497, 534, 536, 525; 382/212, 284; 347/12, 14, 15; 700/124, 700/194
See application file for complete search history.

(56) References Cited

U.S. PATENT DOCUMENTS

| 7,874,634 | B2 | 1/2011 | Horii et al. | |
| 8,199,365 | B2 | 6/2012 | Morishita et al. | |
| 8,320,022 | B2 | 11/2012 | Morishita et al. | |
| 2003/0164876 | A1* | 9/2003 | Pierel | 348/88 |
| 2009/0267982 | A1 | 10/2009 | Horii et al. | |
| 2010/0238258 | A1* | 9/2010 | Shoji | 347/224 |

FOREIGN PATENT DOCUMENTS

| JP | 1-183676 A | 7/1989 |
| JP | 4-369158 A | 12/1992 |
| JP | 2009-262457 A | 11/2009 |

* cited by examiner

*Primary Examiner* — Gabriel Garcia
(74) *Attorney, Agent, or Firm* — Fitzpatrick, Cella, Harper & Scinto

(57) ABSTRACT

The invention provides a technique which allows high-quality printing. An image processing apparatus for forming an image by executing N printing scans for a single region on a printing medium, comprises: a readout unit configured to read out image data of a region corresponding to a k-th printing scan from input image data; a print data generation unit configured to generate print data from the image data by halftone processing; and an obtaining unit configured to obtain position fluctuation information of dots in a preceding printing scan, wherein the readout unit controls a readout position of the region corresponding to the k-th printing scan in accordance with the position fluctuation information at the time of the preceding printing scan obtained by the obtaining unit.

27 Claims, 17 Drawing Sheets

IMAGE PROCESSING APPARATUS AND IMAGE PROCESSING METHOD FOR SUPPRESSING IMAGE DEGRADATION CAUSED BY A PRINTING POSITION FLUCTUATION

BACKGROUND OF THE INVENTION

1. Field of the Invention

The present invention relates to a technique for forming an image based on digital image data on a printing medium to have high quality.

2. Description of the Related Art

In recent years, digital image data captured by a digital camera is normally printed by a printer. The number of tones of image data which can be printed by a printer is generally smaller than that of image data to be handled by a digital camera and PC. On the other hand, the resolution of an image formed by the printer is generally higher than that of an image displayed by a display device such as a PC monitor. Hence, upon printing digital image data by a printer, the number of tones of the digital image data is efficiently decreased by halftone processing. The halftone-processed image data further undergoes image processing in correspondence with a type of a printer which executes printing, and is then printed on a printing medium such as a paper sheet. Note that the type of the printer includes, for example, an ink-jet printer and laser beam printer.

In a print operation by a printer, positions of dots to be printed on a printing medium often fluctuate due to a conveyance error of a printing medium and the like. For example, in an ink-jet printer, an error is often generated between an ideal conveyance amount and actual conveyance amount of a printing medium due to decentration of a motor, slippage of a printing medium, and the like. Such error often causes stripe-like density fluctuations at joint portions between respective printing scans, and an degradation of sharpness. In a laser beam printer, toner images of respective colors are superposed while being deviated from their ideal positions due to various causes such as vibrations of a printer main body, part accuracy variations of respective mechanisms, and the like, thus causing color misalignment at an edge portion of an image.

A technique for eliminating image quality deterioration caused by such position fluctuation of dots to be printed is available. For example, Japanese Patent Laid-Open No. 04-369158 discloses a technique for adjusting a position of a printer head by detecting an error of a printing medium conveyance amount in an ink-jet printer. Also, Japanese Patent Laid-Open No. 01-183676 discloses a technique for controlling the irradiation timing of each laser beam and a position of each reflection mirror based a position shift amount detected using a color misalignment detection mark in a laser beam printer. On the other hand, Japanese Patent Laid-Open No. 2009-262457 discloses a technique for obtaining density information of an image already printed on a printing medium and feeding it back to an input image in an ink-jet printer. This technique can obtain high image quality even when the number of divided passes is reduced in a multi-pass printing technique of the ink jet printer, and can also improve a print speed.

However, the technique disclosed in Japanese Patent Laid-Open No. 04-369158 requires a new adjusting mechanism for positional adjustment of the printer head. In order to attain accurate position correction, the adjusting mechanism requires parts which have higher accuracy than at least a printing medium conveyance mechanism, resulting in an increase in cost of a printer product. Likewise, the technique disclosed in Japanese Patent Laid-Open No. 01-183676 has to use high-cost parts so as to attain accurate position correction. Also, since the techniques disclosed in Japanese Patent Laid-Open Nos. 04-369158 and 01-183676 require mechanical control of the adjusting mechanism, correction results are often not stable due to the influences of the weight of the mechanism itself and inertia (inertia moment). Furthermore, the method disclosed in Japanese Patent Laid-Open No. 2009-262457 can improve density fluctuations, but cannot correct position shifts, thus worsening edge sharpness.

SUMMARY OF THE INVENTION

The present invention provides a technique which allows to form an image based on input image data on a printing medium to have high quality.

According to an aspect of the present invention, an image processing apparatus for forming an image by executing N (N is an integer not less than 2) printing scans for a single region on a printing medium, comprises: a readout unit configured to read out image data of a region corresponding to a k-th (k is an integer which meets $2 \leq k \leq N$) printing scan from input image data; a print data generation unit configured to generate print data which is used in the k-th printing scan and has the number of tones smaller than the number of tones of the input image data from the image data of the region read out by the readout unit by halftone processing; and an obtaining unit configured to obtain position fluctuation information of dots in a (k−1)-th printing scan, wherein the readout unit controls a readout position of the region corresponding to the k-th printing scan in accordance with the position fluctuation information at the time of the (k−1)-th printing scan obtained by the obtaining unit.

According to another aspect of the present invention, an image processing method for forming an image by executing N (N is an integer not less than 2) printing scans for a single region on a printing medium, comprises: a readout step of controlling a readout unit to read out image data of a region corresponding to a k-th (k is an integer which meets $2 \leq k \leq N$) printing scan from input image data; a print data generation step of controlling a print data generation unit to generate print data which is used in the k-th printing scan from the image data of the region read out in the readout step by halftone processing; and an obtaining step of controlling an obtaining unit to obtain position fluctuation information of dots in a (k−1)-th printing scan, wherein in the readout step, a readout position of the region corresponding to the k-th printing scan is controlled in accordance with the position fluctuation information at the time of the (k−1)-th printing scan obtained in the obtaining step.

According to the aforementioned characteristic feature, a technique which allows to form an image based on input image data on a printing medium to have high quality can be provided.

Further features of the present invention will become apparent from the following description of exemplary embodiments (with reference to the attached drawings).

DESCRIPTION OF THE EMBODIMENTS

Preferred embodiments of the present invention will be described in detail hereinafter with reference to the drawings. Note that the following embodiments are merely examples, and do not limit the scope of the present invention.

The first embodiment will be described first. The first embodiment will exemplify a printer of an ink-jet scheme as an image forming apparatus. Especially, an example will be described wherein pixel positions of image information of respective passes before halftone processing are displaced based on detected dot position fluctuation information in a multi-pass printing method which performs N (N is an integer equal to or larger than 2) printing scans for a single region.

<Apparatus Arrangement>

Figure 1:
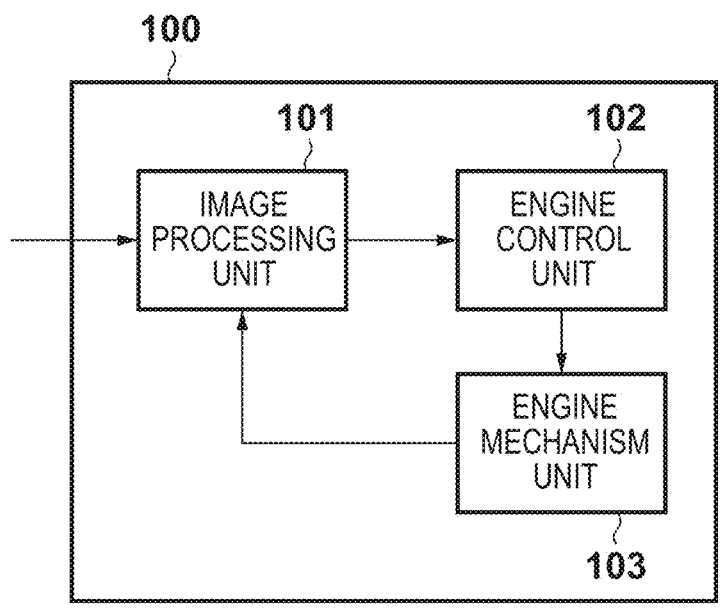
FIG. 1 is a block diagram of an image forming apparatus.

FIG. 1 is a block diagram showing an arrangement example of an image forming apparatus applicable to the first embodiment. An image forming apparatus 100 as an ink-jet printer includes an image processing unit 101, engine control unit 102, and engine mechanism unit 103.

The image processing unit 101 includes a CPU, memory, bus, dedicated image processing circuit, and the like. The image processing unit 101 converts input image data into image data interpretable by the engine control unit 102. The engine control unit 102 includes a control circuit which executes printer head control, printing medium conveyance control, and the like. The engine control unit 102 controls the engine mechanism unit 103 based on the input image data converted by the image processing unit 101. The engine mechanism unit 103 includes a printer head, printing medium conveyance unit, conveyance amount error detection sensor, and the like. The engine mechanism unit 103 drives respective mechanisms according to a control signal from the engine control unit 102, thus printing an output image on a printing medium.

Figure 2:
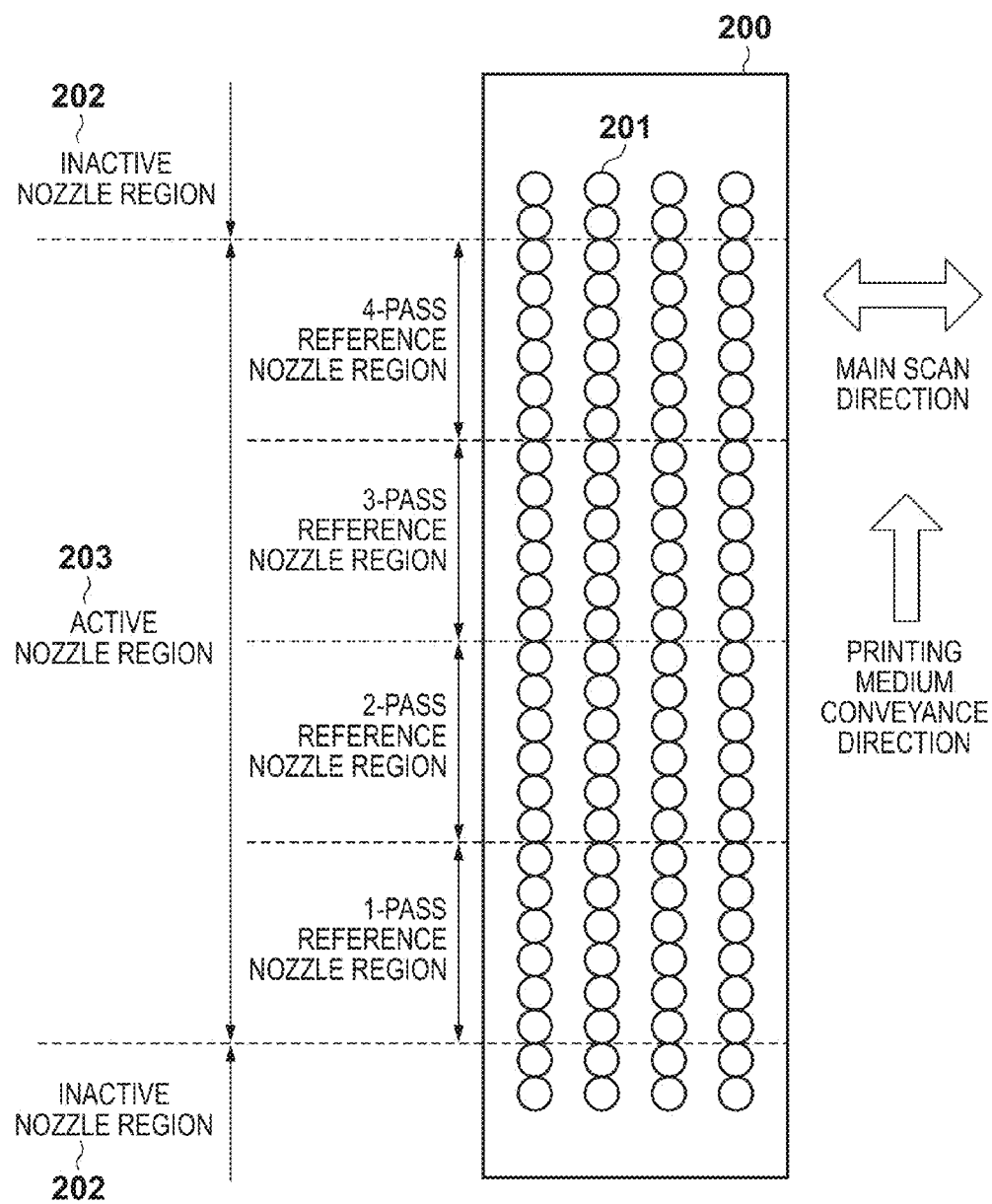
FIG. 2 is a view showing an arrangement example of a printer head.

FIG. 2 shows an arrangement example of a printer head in the first embodiment. A printer head 200 includes nozzle arrays 201 for respective ink colors such as C, M, Y, and K (cyan, magenta, yellow, and black) colors. Each nozzle prints image data on a printing medium by eject an ink droplet based on corresponding printable image data. In general, nozzles arranged on upper and lower end portions of these nozzle arrays are set as inactive nozzle regions 202 since they have large manufacturing variations. On the other hand, nozzles in an active nozzle region 203 arranged on central portion of these nozzle arrays have small manufacturing variations. Nozzles in an active nozzle region 203 are divided into nozzle regions corresponding to respective passes, and are used to print image data.

The ink-jet printer uses a so-called multi-pass printing method. The multi-pass printing method is adopted to eliminate the influences of manufacturing variations of nozzles themselves, non-ejection and ejection amount fluctuations of ink droplets, thus reducing occurrence of density unevenness. In the multi-pass printing method, an image is formed by performing a plurality of printing scans for a single region on a printing medium. Of a plurality of printing scans required to form one line of an image, a first printing scan is called a 1-pass, and a second printing scan is called a 2-pass.

FIG. 2 exemplifies the multi-pass printing operation using four passes. For this purpose, 24 nozzles in the active nozzle region 203 of each nozzle array are divided into four passes to assure pass reference nozzle regions corresponding to respective passes. When dots to be printed are free from any position fluctuation, image data is printed using nozzles of the respective pass reference nozzle regions. When dots suffer a position fluctuation, each pass often prints image data using even nozzles of the pass reference nozzle region of the neighboring pass. Note that in the arrangement example of the printer head shown in FIG. 2, one nozzle array is arranged per color for the sake of simplicity. However, a plurality of nozzle arrays may be arranged for each color, and nozzle arrays to be used in forward and backward printing scans (main scans) of the printer head may be switched.

Figure 3:
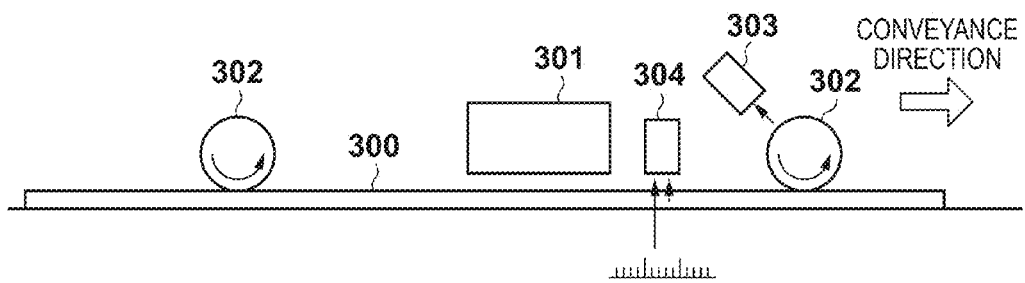
FIG. 3 is a sectional view of a printing medium conveyance unit.

FIG. 3 is a sectional view of a printing medium conveyance unit according to the first embodiment. A printing medium 300 is conveyed by a conveyance roller 302, and an image is printed on the printing medium 300 by a printer head 301. A conveyance amount of the printing medium after a single printing scan of the printer head 301 corresponds to the height of each reference nozzle region shown in FIG. 2. When a conveyance amount error is detected in a previous conveyance operation, the conveyance amount may be adjusted to cancel the previous conveyance amount error. The printing medium conveyance unit of this embodiment includes a rotary encoder 303 used to measure a rotation angle of the conveyance roller 302, so as to detect a conveyance amount error. Furthermore, the printing medium conveyance unit has a member (not shown) conveyed together with the printing medium and an image sensor 304 which obtains a value of a reference scale, which is immovable upon conveyance. As these conveyance amount error detection sensors, a plurality of sensors may be used, or only one sensor may be used.

<Image Processing Operation>

Figure 4:
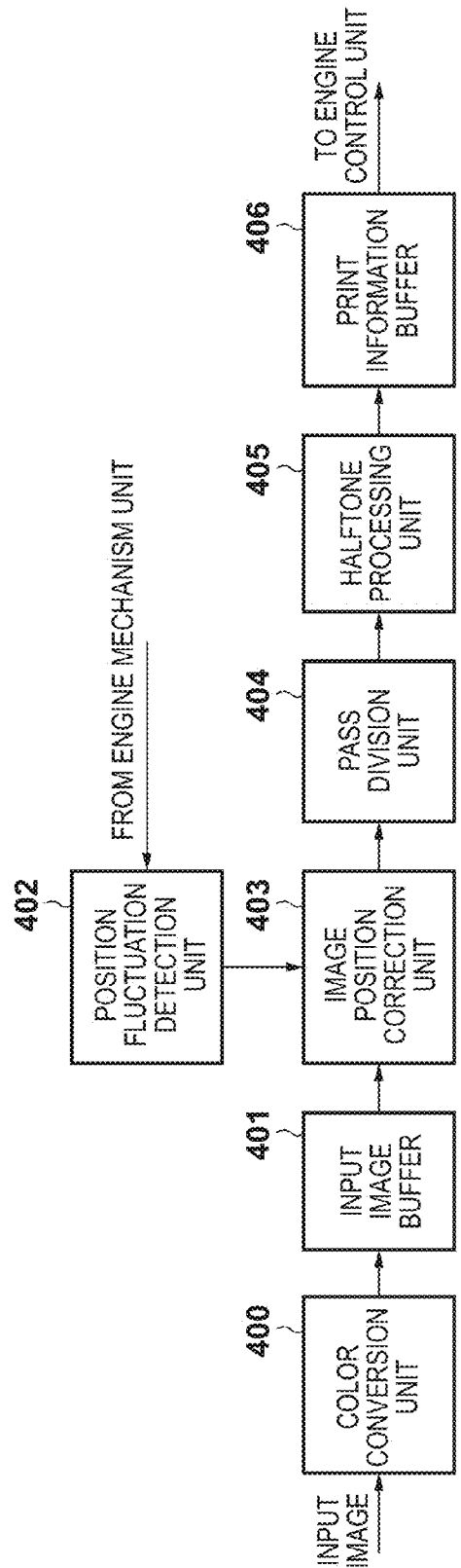
FIG. 4 is a block diagram showing a detailed arrangement example of an image processing unit.

FIG. 4 is a block diagram showing a detailed arrangement example of the image processing unit 101 according to the first embodiment. The image processing unit 101 executes processing for converting an input image into image data interpretable by the engine control unit 102. The image processing unit 101 includes a color conversion unit 400, input image buffer 401, position fluctuation detection unit 402, image position correction unit 403, pass division unit 404, halftone processing unit 405, and print information buffer 406. These units are assigned to the CPU, memory, dedicated processing circuit, and the like. Respective processes may be implemented by software processing of the CPU, or by a dedicated image processing circuit.

The color conversion unit 400 converts image data, which is expressed on an RGB (red, green, and blue) color space or the like, into that on a color space of ink colors C, M, Y, and K, or the like, which can be output by the ink-jet printer. The input image buffer 401 stores the input image data, which are converted into the ink colors.

The position fluctuation detection unit 402 obtains detection data from the conveyance amount error detection sensors mounted in the printing medium conveyance unit shown in FIG. 3, and detects a position fluctuation (position shift amount or the like) from an ideal conveyance amount based on these data. That is, in the first embodiment, position fluctuation information mainly caused by a conveyance amount error of the printing medium is detected. More specifically, a rotation angle of the conveyance roller 302 is obtained from the rotary encoder 303 first. Based on the circumferential length of the conveyance roller 302 and the read rotation angle, an actual conveyance amount at the time of a printing scan is calculated, and position fluctuation information is detected from a difference between the actual conveyance amount and a predetermined conveyance amount as a target. Alternatively, the image sensor 304 obtains a position of the member, which is conveyed together with the printing medium, and a value of the reference scale, which is immovable upon conveyance, and the position of the member is compared with the reference scale value, thereby detecting position fluctuation information from a target conveyance amount.

The image position correction unit 403 executes processing for displacing the input image based on the position fluctuation detected by the position fluctuation detection unit 402, and reading out an image region to be printed by the next printing scan. That is, the image position correction unit 403 displaces an image of print data corresponding to a k-th (k is an integer which satisfies 2≤k≤N) printing scan based on position fluctuation information at the time of a (k−1)-th printing scan. The method of displacing the input image by the image position correction unit 403 based on the detected position fluctuation information will be described below with reference to FIG. 5.

Figure 5:
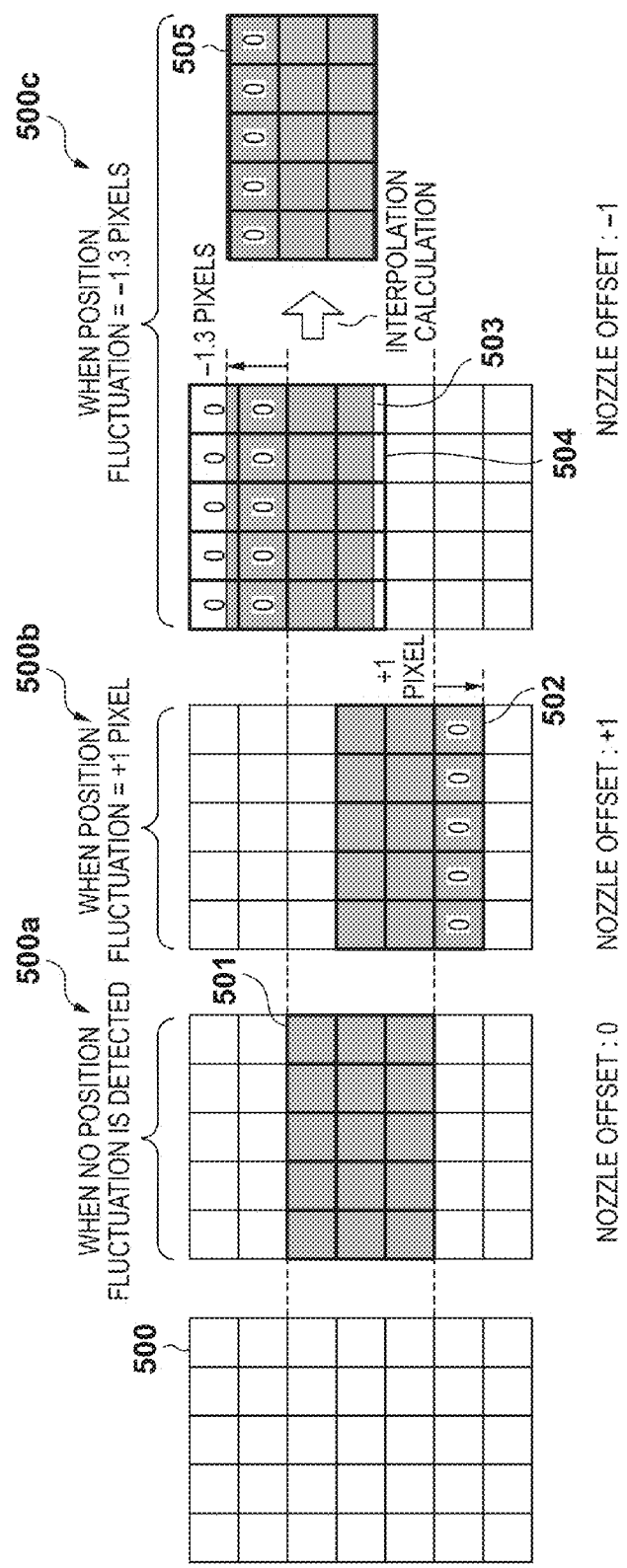
FIG. 5 is a view for explaining an image position correction method.

Reference numeral 500a in FIG. 5 denotes an operation of the image position correction unit 403 when "no" position fluctuation is detected. The image position correction unit 403 reads out image data of an image region 501 to be printed in the next printing scan from the input image buffer 401 which stores an input image 500, and outputs the readout image data to the subsequent pass division unit 404. When no position fluctuation is detected, the image position correction unit 403 sets "0" in a nozzle offset used to determine inactive nozzles, and outputs it to the pass division unit 404. Note that the height of the image region 501 matches that of the active nozzle region 203 of the printer head shown in FIG. 2.

Reference numeral 500b in FIG. 5 denotes an operation of the image position correction unit 403 when position fluctuation information indicates "+1 pixel". When the position fluctuation corresponds to an integer pixel amount like "+1 pixel", the image position correction unit 403 sets an image region 502 which is displaced by an amount corresponding to the position fluctuation from the image region 501 to be printed in a printing scan free from any position fluctuation. The image position correction unit 403 then reads out pixel values from image data for a region which overlaps the image region 501, stores pixel values "0" for a region which does not overlap the image region 501, and outputs these pixel values as those of the image data of this image region 502. When the position fluctuation corresponds to an integer pixel amount, the image position correction unit 403 sets "+1" in a nozzle offset, since it sets the position fluctuation as the nozzle offset.

Reference numeral 500c in FIG. 5 denotes an operation of the image position correction unit 403 when position fluctuation information indicates "−1.3 pixels". When a position fluctuation to a decimal pixel position is detected, the image position correction unit 403 displaces an image by a linear interpolation calculation between pixels. For this purpose, the image position correction unit 403 sets an image region 504 which allows to calculate, by an interpolation calculation, pixel values of an image region 503 displaced by an amount corresponding to the position fluctuation from the image region 501 printed in a printing scan free from any position fluctuation. The image position correction unit 403 reads out pixel values from image data for a region which overlaps the image region 501, and stores pixel values "0" for a region which does not overlap the image region 501. The image position correction unit 403 then outputs, for this image region 504, pixel values of image data of an image region 505 whose pixel values after displacement are calculated by a linear interpolation calculation. When the position fluctuation to a decimal pixel position is detected, the image position correction unit 403 sets "−1" in a nozzle offset since it sets a value obtained by truncating a digit after the decimal point as the nozzle offset. Note that the linear interpolation calculation is used to calculate pixel values at pixel positions which are not located on grid points. However, any other interpolation calculations such as nearest neighbor interpolation and bicubic interpolation may be used as long as an image region can be displaced. In correspondence with any of the interpolation methods to be used, the image region 504 is set.

The pass division unit 404 distributes the image region, which is extracted after the position correction of the image position correction unit 403, and its image data into N (N is an integer equal to or larger than 2) printing scans (passes). As described above, the number of divided passes of the pass division unit 404 in the first embodiment is "4". An example of distributing image data to respective passes at predetermined ratios will be described below with reference to FIG. 6.

Figure 6:
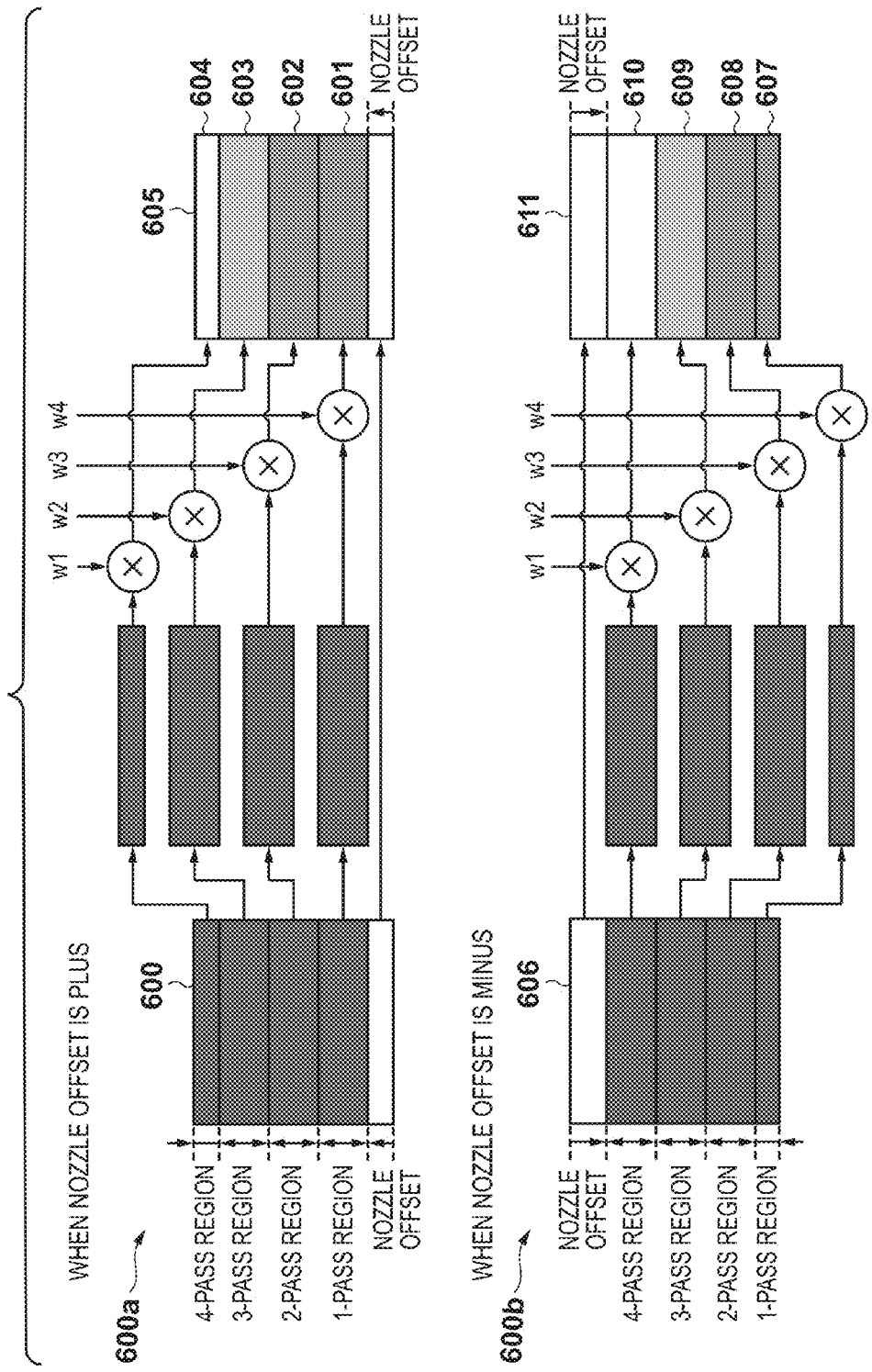
FIG. 6 is a view for explaining a pass division method.

Reference numeral 600a in FIG. 6 denotes an operation of the pass division unit 404 when the nozzle offset is plus. An input image region 600 is divided in turn from the lower portion of FIG. 6 into a nozzle offset region, 1-pass region, 2-pass region, 3-pass region, and 4-pass region. The nozzle offset region is a region in which pixel values "0" are stored, as described in the paragraph of the image position correction unit 403. The height of each pass region is determined by each pass reference nozzle region of the printer head 200 shown in FIG. 2. Since the 4-pass region does not include any image data, it is cut off to a region less than the predetermined height.

The pass division unit 404 generates 1-pass image data 601, 2-pass image data 602, 3-pass image data 603, and 4-pass image data 604 by multiplying the respective pass regions divided in this way by predetermined weighting coefficients w1, w2, w3, and w4. The pass division unit 404 generates image data 605 to be printed in one printing scan by combining these image data and adding the nozzle offset region (print data generation). For the predetermined weighting coefficients, values, a sum of all of which is "1", are set, so that a sum total of image data distributed to all the passes is preferably equal to the input image data. When a position fluctuation to a decimal pixel position is detected, boundaries of the respective pass regions cannot be set for a pixel unit, as shown in FIG. 6. In this case, upon calculating image data corresponding to a boundary between two pass regions, a coefficient obtained by blending the predetermined coefficients of the two passes at occupation ratios of the pass regions with respect to pixels is used.

Reference numeral 600b in FIG. 6 denotes an operation of the pass division unit 404 when the nozzle offset is minus. An input image region 606 is divided in turn from the upper portion of FIG. 6 into a nozzle offset region, 4-pass region, 3-pass region, 2-pass region, and 1-pass region. Since the 1-pass region does not include any image data, it is cut off to a region less than the predetermined height. The pass division unit 404 generates 1-pass image data 607, 2-pass image data 608, 3-pass image data 609, and 4-pass image data 610 by multiplying the regions divided in this way by predetermined coefficients w1, w2, w3, and w4. Then, the pass division unit 404 generates image data 611 to be printed in one printing scan by combining these data.

When the nozzle offset is plus, as denoted by reference numeral 600a, the final pass region is cut off. Hence, in order to form an image more properly, it is desirable to divide passes so that distribution ratios of image data become gradually smaller in a direction in which the final pass region is cut off. Alternatively, in order to prevent the final pass region from being cut off, a printing medium conveyance amount is set in advance to be smaller than the height of each reference nozzle region. On the other hand, when the nozzle offset is minus, as denoted by reference numeral 600b, the 1-pass region is cut off. However, when pass regions are set in consideration of this cutoff amount in the next and subsequent passes, joint stripes between passes can be improved.

Figure 7:
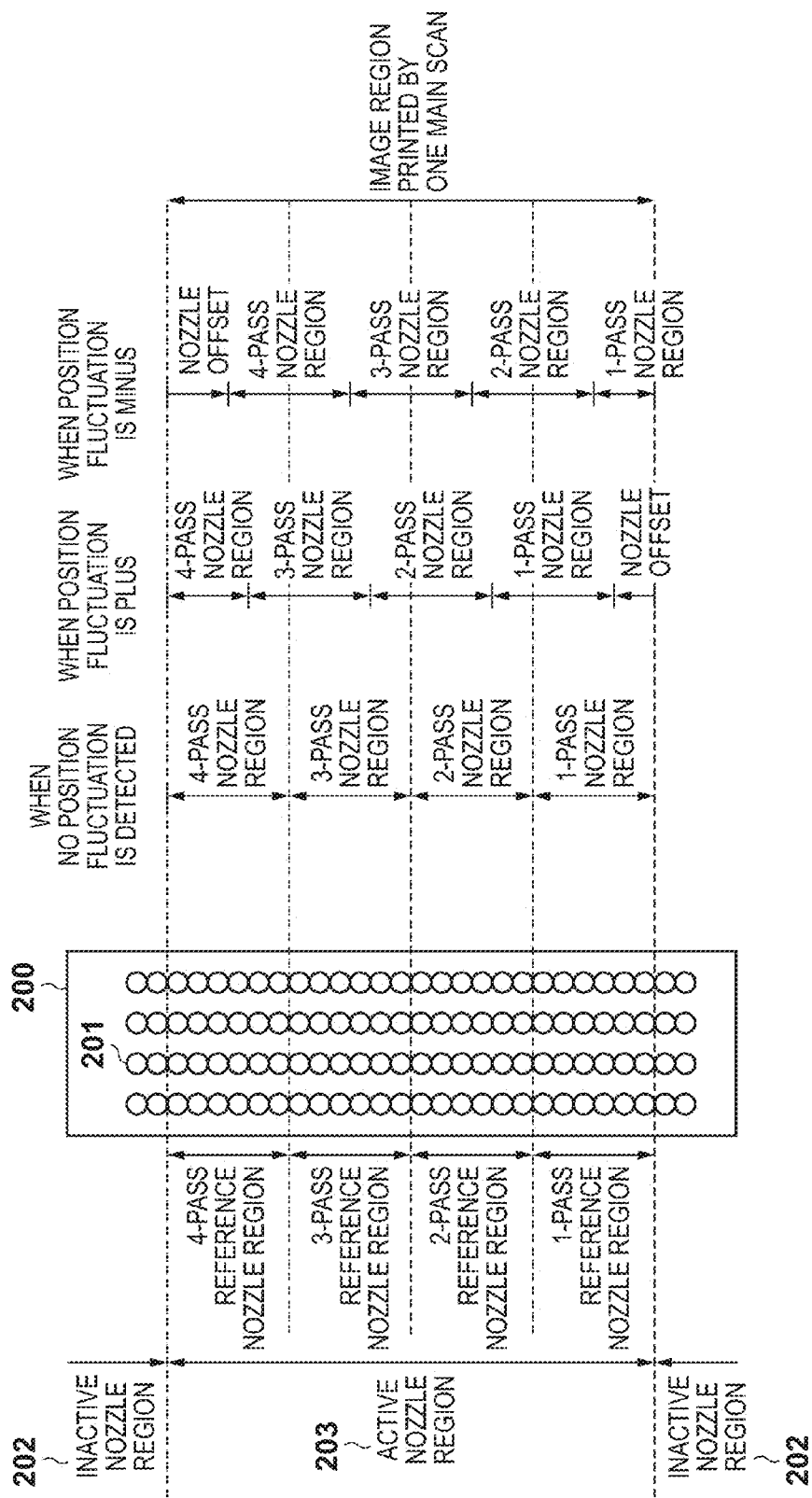
FIG. 7 is a view for explaining assignment of pass-divided image data to nozzles.

The image data which is processed by the pass division unit 404 and corresponds to one printing scan is assigned to respective nozzles, as shown in FIG. 7. Therefore, when a position fluctuation has occurred, nozzles to be used by respective passes are changed beyond the respective pass reference nozzle regions. However, since the nozzle offset region and respective pass regions are divided in turn with respect to the input image region, the height of a pass region which exceeds the input image region is limited, and the respective passes never active nozzles in the inactive nozzle regions.

Note that the pass division unit 404 may divide image data not only at the predetermined ratios, but also for respective feature amounts such as an image edge and thin line. In this case as well, it is desirable that a sum total of image data distributed to all the passes becomes equal to the input image data. The pass division unit 404 may be executed after the halftone processing unit 405 (to be described later). In this case, using a decimation pattern called a pass mask by shifting it by the nozzle offset, the halftone processing result is divided into respective passes.

The halftone processing unit 405 converts an input image having the number of tones of 8 bits or 12 bits to data of the number of tones of 1 bit or 2 bits, which can express pseudo tones of the input image and is printable by the image forming apparatus of this embodiment. The halftone processing unit 405 is implemented by dithering or error diffusion as a known technique.

The print information buffer 406 stores print data generated by the pass division unit 404 and halftone processing unit 405 by a size to be printed for one scan of the printer head.

The print data generated by the aforementioned image processing is output to the engine control unit 102, and the engine mechanism unit 103 prints an image on a printing medium. The engine mechanism unit 103 repeats the aforementioned generation and printing of print information, and conveyance of the printing medium until printing of the designated image data is complete.

As described above, according to the first embodiment, a printing medium conveyance amount error is detected as position fluctuation information, and a pixel position of a region which is read out from an input image and corresponds to a printing scan is displaced. With this processing, degradation of sharpness of an output image caused by a position fluctuation can be eliminated. This processing is image processing by the image processing unit 101, and a new mechanism for printer head adjustment need not be added. For this reason, degradation of image quality caused by a position fluctuation can be suppressed by a minimum increase in cost.

Also, according to the first embodiment, the image position correction is executed before the halftone processing. Thus, the position correction can be executed without changing a desired dot pattern obtained by the halftone processing.

The second embodiment will be described below. An inkjet printer which executes multi-pass print method of four passes will be exemplified below as an image forming apparatus applicable to the second embodiment. Especially, an example will be explained wherein image information already printed on a printing medium is acquired using an image sensor added to a printer head, and a pixel position of next image information to be printed is displaced. Since the overall arrangement of the image forming apparatus of the second embodiment is the same as that shown in FIG. 1, a description thereof will not be repeated.

Figure 8:
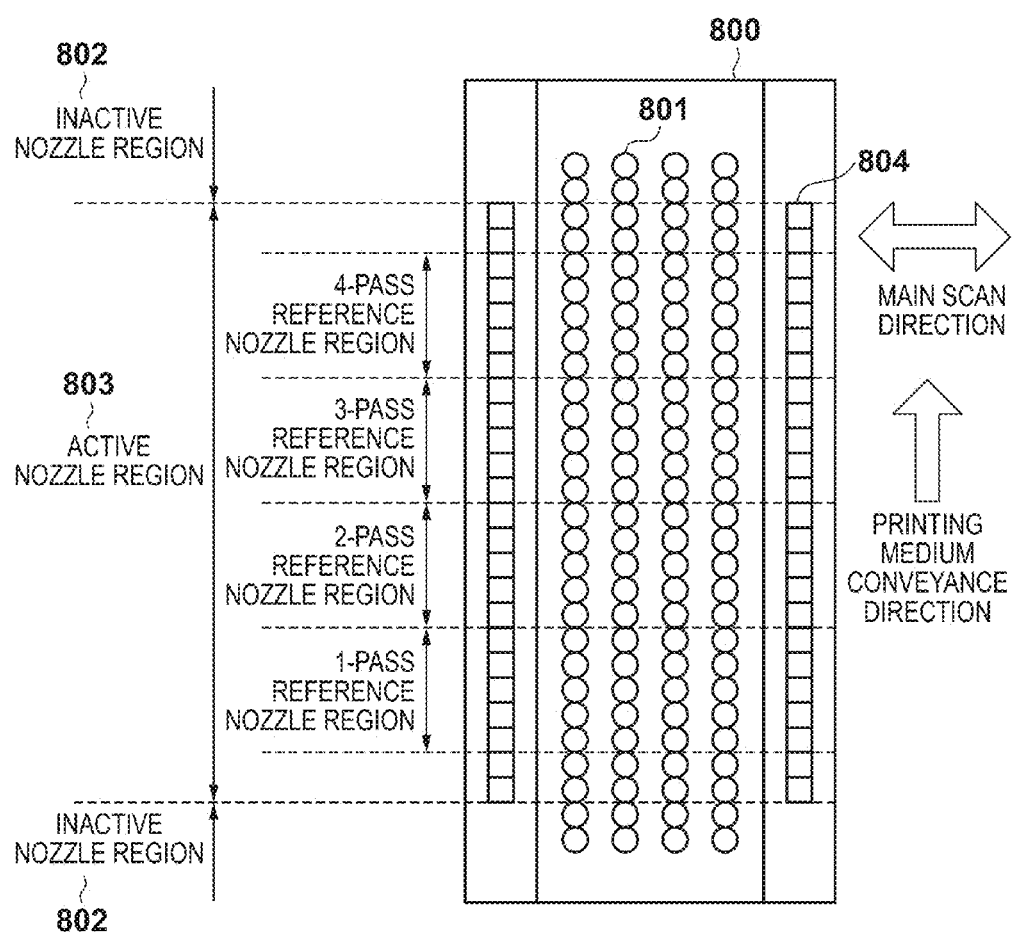
FIG. 8 is a view showing an arrangement example of a printer head.

FIG. 8 shows an arrangement example of a printer head of the image forming apparatus according to the second embodiment. To a printer head 800, image sensors 804 are added on the two sides of the printing scan (main scan) direction of the printer head. The two image sensors are selectively used in forward and backward printing scans and acquire image information printed on a printing medium prior to ink droplet ejection by nozzles.

The printer head 800 includes nozzle arrays 801 for respective ink colors, and prints an image on a printing medium by ejecting ink droplets based on printable image data assigned to respective nozzles. In general, upper and lower end portions of these nozzle arrays are set as inactive nozzle regions 802 since they have large manufacturing variations. On the other hand, nozzles in an active nozzle region 803 at a central portion of these nozzle arrays have small manufacturing variations. Nozzles in an active nozzle region 803 include reference nozzle regions of respective passes, and are used to print actual image data. In this embodiment, 20 out of 24 nozzles of the active nozzle region 803 of each nozzle array are divided into four passes, and are set as respective pass reference nozzle regions. The remaining four nozzles are used when a position fluctuation of a printing medium has occurred. Note that in the arrangement example of the printer head shown in FIG. 8, one nozzle array is arranged per color for the sake of simplicity. However, a plurality of nozzle arrays may be arranged per color, and nozzle arrays to be used may be switched in forward and backward printing scans of the printer head. The image sensors are not limited to the arrangement described in this embodiment, as long as they can obtain image information printed on a printing medium prior to ink ejection, and a relative position between the printer head and image sensors can be detected before and after conveyance of the printing medium.

<Image Processing Operation>

Figure 9:
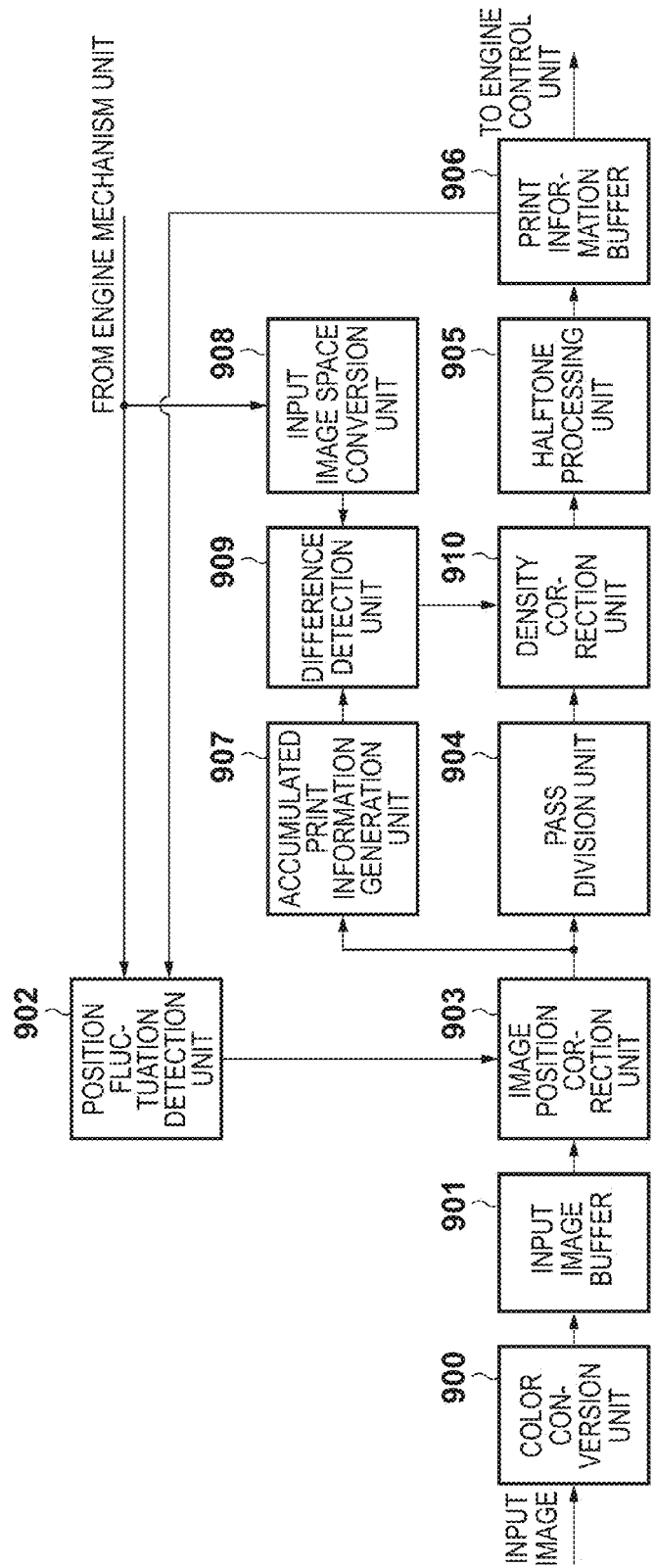
FIG. 9 is a block diagram showing a detailed arrangement example of an image processing unit.

FIG. 9 is a block diagram showing a detailed arrangement example of the image processing unit 101 according to the second embodiment. The image processing unit 101 executes processing for converting an input image into print data having the number of tones interpretable by the engine control unit 102. For this purpose, the image processing unit 101 includes various units shown in FIG. 9. These units are assigned to the CPU, memory, dedicated processing circuit, and the like. Respective processes may be implemented by software processing of the CPU, or by a dedicated image processing circuit. Note that a color conversion unit 900, input image buffer 901, halftone processing unit 905, and print information buffer 906 are the same as the corresponding units of the first embodiment, and a description thereof will not be repeated.

A position fluctuation detection unit 902 detects a position fluctuation amount from an ideal printing medium conveyance amount based on density information already printed on a printing medium, which information is acquired using the image sensors 804 included in the printer head 800. The detection method according to the second embodiment will be described below with reference to FIG. 10.

Figure 10:
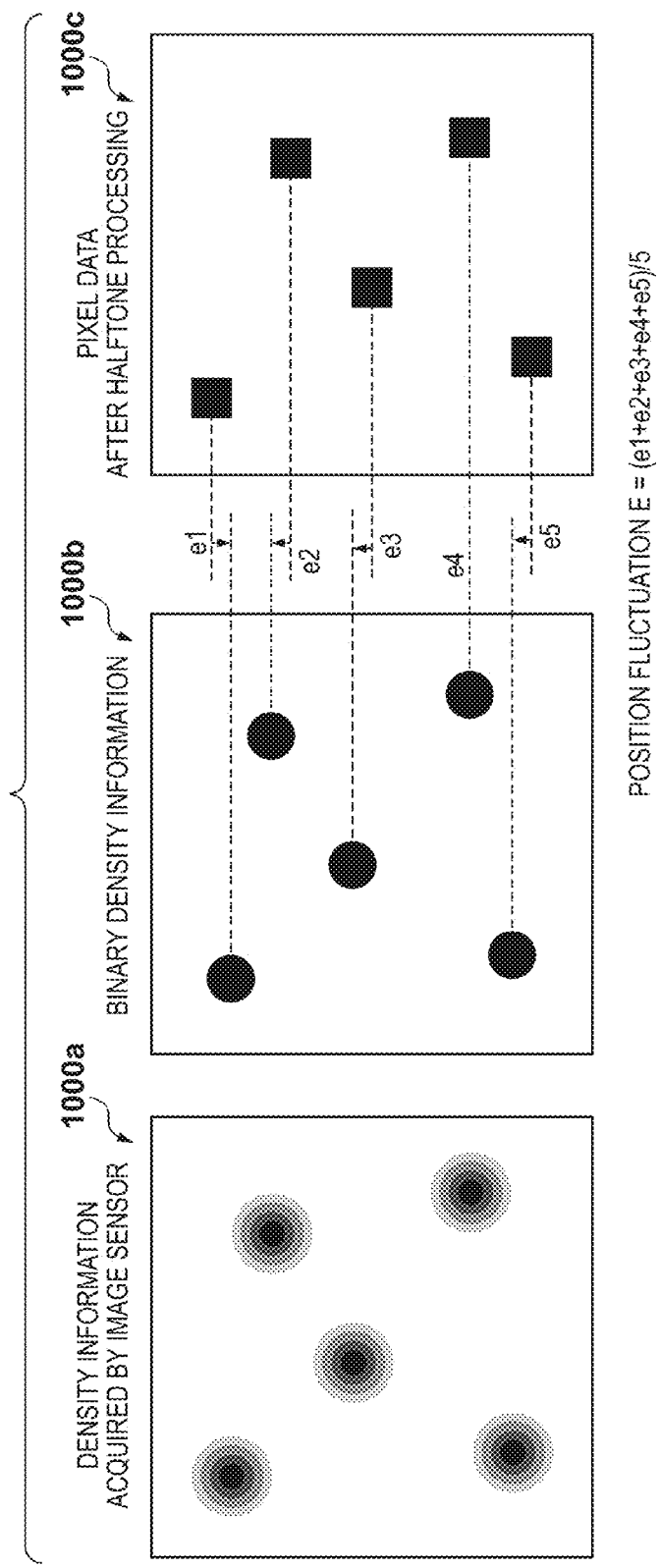
FIG. 10 is a view for explaining a position fluctuation detection method.

Each image sensor 804 acquires density information 1000a of a region printed by a preceding pass, as shown in FIG. 10. Respective dots represent landing positions of ejected ink droplets on a printing medium. Although the density of an ink itself is constant, an ink droplet printed on the printing medium has a density distribution due to bleeding to the printing medium and a dot gain phenomenon. Also, density information in which respective dots have density distributions is acquired depending on the resolution and the number of tones of the image sensor 804.

The position fluctuation detection unit 902 binarizes the acquired density information to obtain density information 1000b. Then, the position fluctuation detection unit 902 calculates correlations between this binary density information and image data obtained when the preceding pass stored in the print information buffer 906 and indicated by 1000c has undergone halftone processing, thus detecting position fluctuation information. In this case, from differences between the respective dots and positions of image data, which are associated with each other, a position fluctuation of the printing medium is detected. In this case, the printed position of each individual dot on the printing medium often fluctuates due to a manufacturing variation of the corresponding nozzle and the influence of an airflow on ink droplets. For this reason, as shown in FIG. 10, upon detection of a position fluctuation E, a plurality of differences (five differences e1, e2, e3, e4, and e5 in FIG. 10) are averaged to detect a more accurate position fluctuation. Note that the position fluctuation detection method of this embodiment is not limited to this, and an arbitrary method of detecting a position fluctuation based on density information of an already printed image and image data after the halftone processing can be used.

An image position correction unit 903 executes processing for displacing an input image based on the position fluctuation information detected by the position fluctuation detection unit 902, and reading out an image region to be printed in the next printing scan. A difference between the image position correction unit 903 of the second embodiment and the image position correction unit 403 of the first embodiment lies in a method of reading out a region to be printed in the next printing scan. More specifically, when a position fluctuation occurs for a region to be printed in a printing scan next to that free from any position fluctuation, the image position correction unit 403 of the first embodiment extracts and outputs only a portion of this region.

Even when a position fluctuation occurs, the image position correction unit 903 of the second embodiment extracts a region to include a region to be printed in a printing scan next to that free from any position fluctuation. Thus, the density of a joint portion between neighboring passes can be compensated for more properly. A method of displacing a readout position of a region from an input image by the image position correction unit 903 will be described below with reference to FIG. 11.

Figure 11:
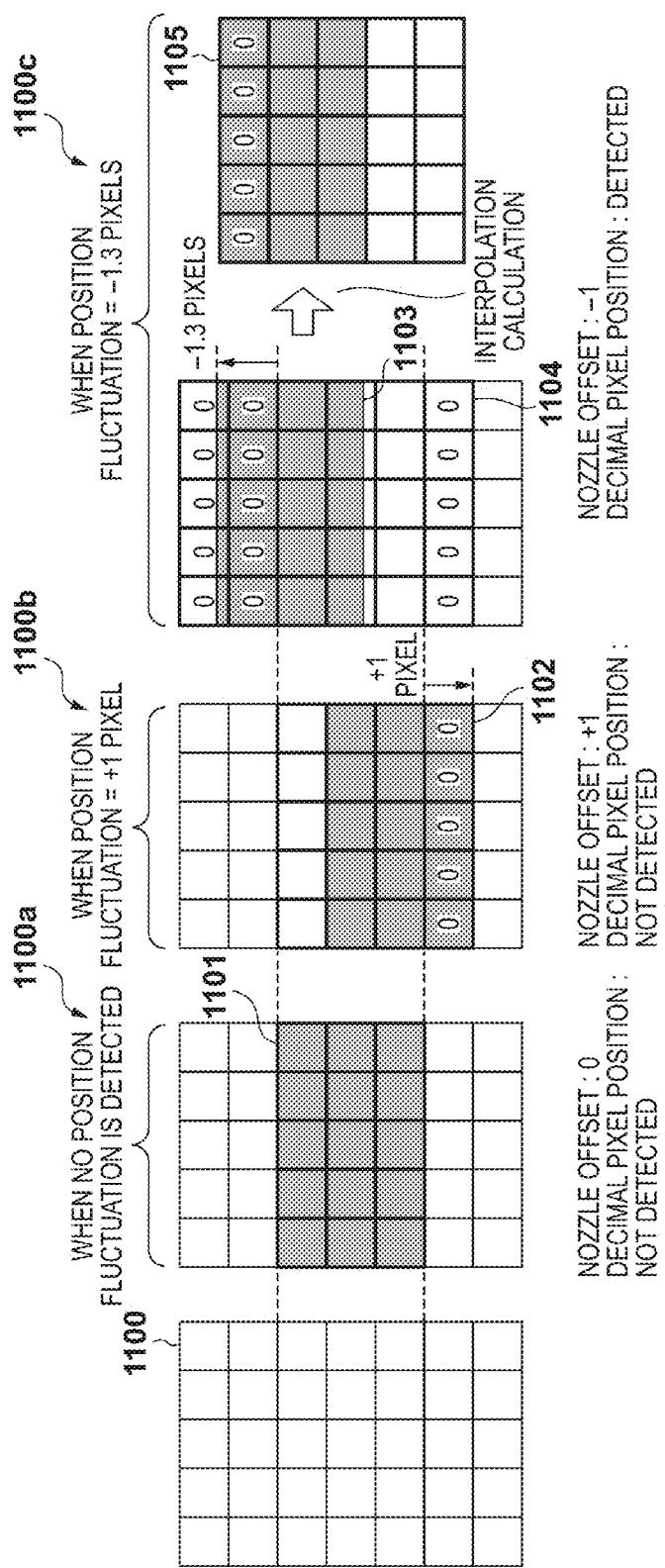
FIG. 11 is a view for explaining an image position correction method.

Reference numeral 1100a in FIG. 11 denotes an operation of the image position correction unit 903 when "no" position fluctuation is detected. The image position correction unit 903 reads out image data of a region 1101 to be printed in the next printing scan from the input image buffer 901, which stores an input image 1100, and outputs the readout image data to a pass division unit. When no position fluctuation is detected, the image position correction unit 903 sets "0" in a nozzle offset.

Reference numeral 1100b in FIG. 11 denotes an operation of the image position correction unit 903 when position fluctuation information indicates "+1 pixel". When a position fluctuation corresponds to an integer pixel amount like "+1 pixel", the image position correction unit 903 sets a region 1102 obtained by extending the region 1101 to be printed in the printing scan free from any position fluctuation by an amount corresponding to the position fluctuation. The image position correction unit 903 reads out image data for a region which overlaps the region 1101 with respect to this region 1102, and stores and outputs pixel values "0" in the region extended by the amount corresponding to the position fluctuation. When the position fluctuation corresponds to the integer pixel amount, the image position correction unit 903 sets "+1" in a nozzle offset, since it sets the position fluctuation as the nozzle offset.

Reference numeral 1100c in FIG. 11 denotes an operation of the image position correction unit 903 when position fluctuation information indicates "−1.3 pixels". When a position fluctuation to a decimal pixel position is detected, the image position correction unit 903 displaces an image by linear interpolation between pixels. In order to express a region obtained by extending the region 1101 to be printed in the printing scan free from any position fluctuation by an amount corresponding to the position fluctuation using image data when a position fluctuation occurs, image data of a region 1105 can be used. Note that the region 1105 considers the position fluctuation detected to a decimal pixel position. The image position correction unit 903 sets a region 1104 which allows to calculate pixel values of this region 1105 by an interpolation calculation, reads out image data for a region which overlaps the region 1101, and stores pixel values "0" for a region which does not overlap the region 1101. Then, the image position correction unit 903 outputs image data of the region 1105 obtained by calculating pixel values after displacement by a linear interpolation calculation for this region 1104. When the position fluctuation to a decimal pixel position is detected, the image position correction unit 903 sets "−1" in a nozzle offset since it sets a value obtained by truncating a digit after the decimal point as the nozzle offset. Note that the linear interpolation calculation is used to calculate pixel values at pixel positions which are not located on grid points. However, any other interpolation calculations may be used as long as a region can be displaced.

The pass division unit 904 distributes a region which is read out after the position correction by the image position correction unit 903 and its image data into N passes based on the nozzle offset. As described above, the number of divided passes of the pass division unit 904 of the second embodiment is "4". An example of distributing image data to respective passes at predetermined ratios will be described below with reference to FIG. 12.

Figure 12:
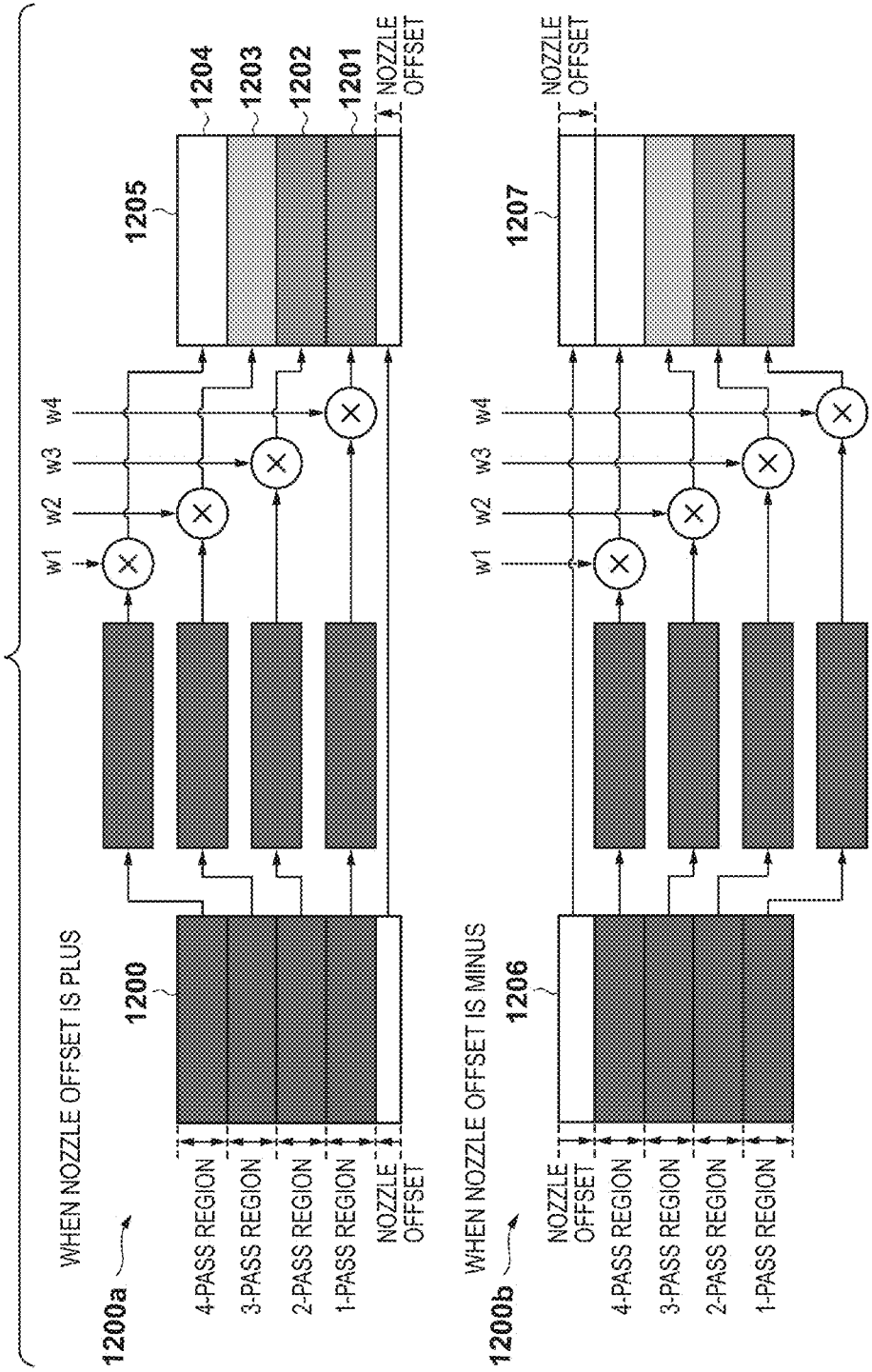
FIG. 12 is a view for explaining a pass division method.

Reference numeral 1200a in FIG. 12 denotes an operation of the pass division unit 904 when the nozzle offset is plus. An input image region 1200 is divided in turn from the lower portion of FIG. 12 into a nozzle offset region, 1-pass region, 2-pass region, 3-pass region, and 4-pass region. The nozzle offset region is a region in which pixel values "0" are stored, as described in the paragraph of the image position correction unit 903. The height of each pass region is determined by that of each pass reference nozzle region of the printer head 800 shown in FIG. 8.

The pass division unit 904 generates 1-pass image data 1201, 2-pass image data 1202, 3-pass image data 1203, and 4-pass image data 1204 by multiplying the respective pass regions divided in this way by predetermined weighting coefficients. The pass division unit 904 generates image data 1205 to be printed in one printing scan by combining these image data and adding the nozzle offset region. When a position fluctuation to a decimal pixel position is detected, boundaries of the respective pass regions cannot be set for a pixel unit, as shown in FIG. 12. In this case, upon calculating image data corresponding to a boundary between two pass regions, a coefficient obtained by blending the predetermined coefficients of the two passes at occupation ratios of the pass regions with respect to pixels is used.

Reference numeral 1200*b* in FIG. 12 denotes an operation of the pass division unit 904 when the nozzle offset is minus. Likewise, an input image region 1206 is divided into pass regions, and data of the divided regions are multiplied by predetermined coefficients, thereby generating image data 1207 to be printed in one printing scan.

In the above description, the pass division unit 404 of the first embodiment cuts off a pass region based on the nozzle offset value even when the height of the pass region is less than that of the predetermined reference nozzle region. By contrast, the pass division unit 904 of the second embodiment divides the respective pass regions to have the height of the predetermined reference nozzle region even when the "nozzle offset is plus" or when the "nozzle offset is minus". Such division can be attained since the aforementioned image position correction unit 903 extends an image region to be printed in a printing scan free from any position fluctuation by an amount corresponding to the position fluctuation.

Figure 13:
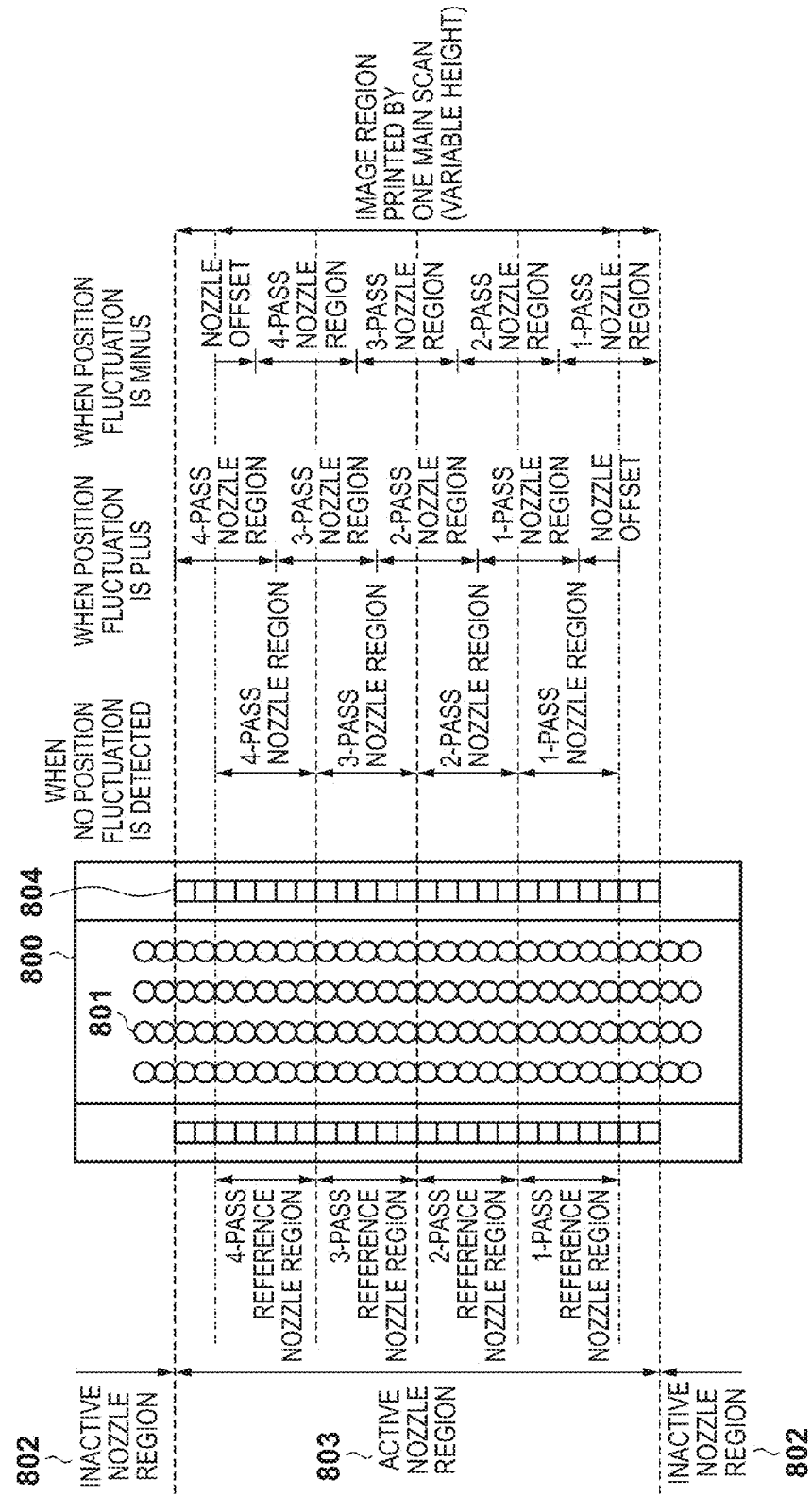
FIG. 13 is a view for explaining assignment of pass-divided image data to nozzles.

Image data which are processed by the pass division unit 904 and correspond to a single printing scan are assigned to respective nozzles, as shown in FIG. 13. Therefore, when a dot position fluctuation occurs, nozzles to be used in respective passes are changed beyond the respective pass reference nozzle regions. Also, nozzles, which are not included in the pass reference nozzle regions but are included in the active nozzle region 803, are often used.

In this way, by assuring sufficiently broad nozzle regions which are not included in the pass reference nozzle regions but are included in the active nozzle region 803, appropriate position correction can be attained even when a position fluctuation of dots is large. Furthermore, the height of image data corresponding to one printing scan processed by the pass division unit 904 is variable. Therefore, a conveyance amount is an amount obtained by subtracting a nozzle offset from the height of the reference nozzle region of each pass, and it is preferable that a conveyance amount error generated in the previous conveyance operation is not accumulated.

Note that the pass division unit 904 according to the second embodiment may divide image data not only at the predetermined ratios but also for respective feature amounts such as an image edge and thin line. In this case as well, it is desirable that a sum total of image data distributed to all the passes becomes equal to the input image data.

An accumulated print information generation unit 907 generates accumulated print information by summing up (accumulating) ideal density information printed on a printing medium until an immediately preceding scan. As a generation method, this information can be generated by multiplying position-corrected image data by an accumulated coefficient obtained by adding predetermined coefficients used in the pass division unit 904 up to a pass to be accumulated. Also, this information can be generated by sequentially accumulating image data for respective passes output from the pass division unit 904.

An input image space conversion unit 908 converts density information, which has already been printed on a printing medium, and is acquired by the image sensors 804 added to the printer head 800, into that on an input image space. The density information printed on the printing medium has the density distribution 1000*a* shown in FIG. 10, as described above. However, image data to be printed is converted from input multi-tone image data into output image data having the small number of tones which can artificially express original tones by certain areas by the halftone processing. Therefore, this input image space conversion unit 908 is required to convert density information on a printing medium having a density distribution due to various causes into the number of tones on the input image space, and to execute inverse conversion of the halftone processing. Such conversion can be implemented by applying the Kubelka-Munk formula. Also, the density information acquired by the image sensors 804 is filtered through a smoothing filter so as to convert the density information into that on the input image space by simulation.

A difference detection unit 909 (difference calculation unit) calculates a difference between the accumulated print information calculated by the accumulated print information generation unit 907 and density information on the printing medium, which information is converted by the input image space conversion unit 908. Since the accumulated print information generation unit 907 generates the accumulated print information after position correction with the preceding pass, no position fluctuation exists between the accumulated print information and the density information on the printing medium. The difference between these pieces of information is density nonuniformity on the printing medium, which is caused by manufacturing variations of nozzles, non-ejection and ejection amount fluctuations of ink droplets, and the like. Then, a density correction unit 910 adds the difference detected by the difference detection unit 909 before halftone processing to the position-corrected image data, thereby correcting density nonuniformity which has occurred on the printing medium.

The print data generated by the aforementioned image processing is output to the engine control unit 102, and the engine mechanism unit 103 prints an image on the printing medium. The engine mechanism unit 103 repeats the aforementioned generation and printing of print data and conveyance of the printing medium until printing of designated image data is complete.

As described above, according to the second embodiment, an image already printed on the printing medium is detected using the image sensors to determine a position fluctuation caused by a printing medium conveyance amount error. Based on the determined position fluctuation information, pixel positions of an input image before the halftone processing are displaced. The above processing can eliminate a sharpness drop of an output image caused by the position fluctuation of dots. Note that conventional image sensors used in position correction and density correction can also be used as the aforementioned image sensors, and an increase in cost due to an increase in the number of parts can be minimized.

The third embodiment will be described below. As the third embodiment of an image forming apparatus according to the present invention, a laser beam printer of an electrophotography system, which prints an image by dividing it into plane images of four colors (C, M, Y, and K) will be exemplified below. Note that the four colors are to be used in this embodiment, but the present invention is applicable to an apparatus which forms a color image using arbitrary N colors (N is an integer equal to or larger than 2). Especially, an example will be explained wherein a preceding color toner image formed on a transfer belt is acquired by a density sensor, and pixel positions of a next color toner image to be printed are displaced. Note that the overall arrangement of the image forming apparatus of the third embodiment is roughly the same as that of FIG. 1 except that the engine mechanism unit 103 adopts a printing mechanism of the laser beam printer, and a description thereof will not be repeated.

Figure 14:
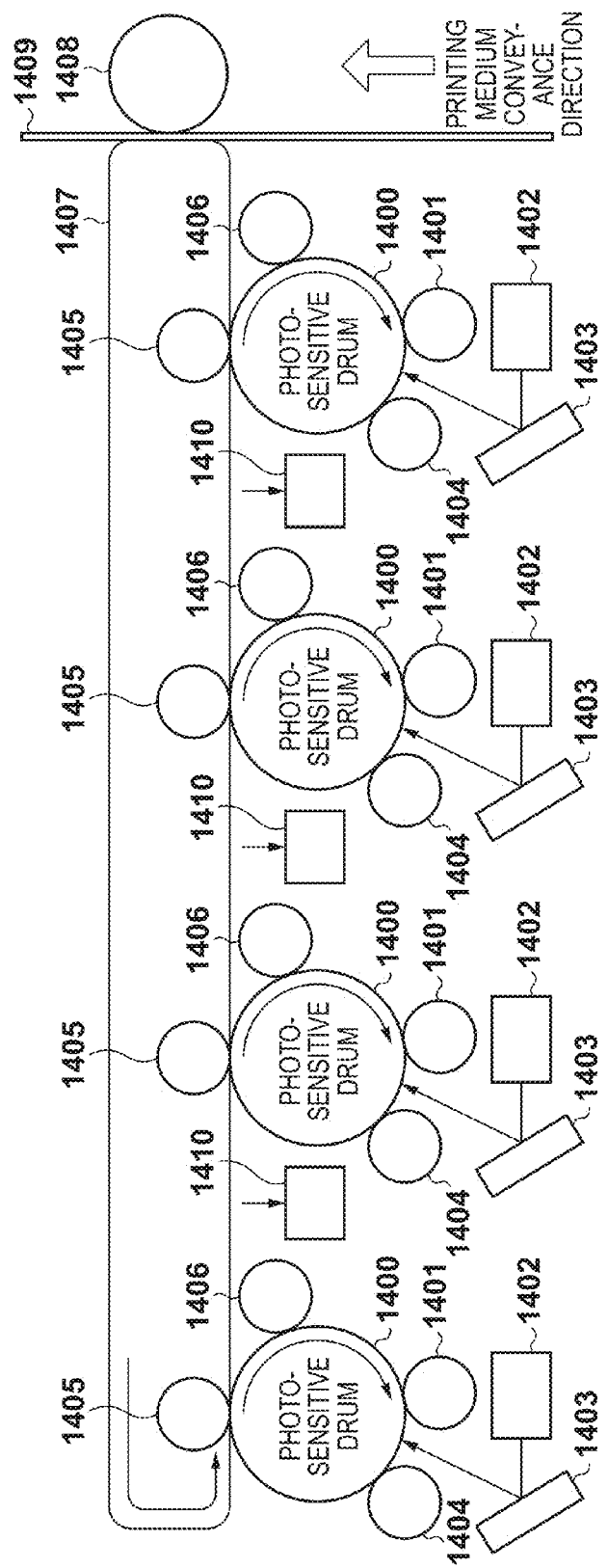
FIG. 14 is an exemplary sectional view of an engine mechanism unit.

FIG. 14 is a sectional view showing an arrangement example of the engine mechanism unit 103 according to the third embodiment. In the neighborhood of each photosensitive drum 1400 which forms a color toner image, a charging roller 1401 which gives a predetermined potential to the photosensitive drum is disposed. Also, a laser light source 1402 which emits a laser beam according to image data, and a reflection mirror 1403 which exposes the photosensitive drum in the main scan direction by reflecting the laser beam emitted by the laser light source 1402 while being rotated are disposed. Furthermore, a developing roller 1404 which forms a color toner image on the photosensitive drum, a primary transfer roller 1405 which forms a color toner image on a transfer belt 1407, and a cleaning brush 1406 which removes a residual toner and residual potential on the photosensitive drum are arranged. These components are arranged in series for respective color toners. Then, the transfer belt 1407 on which a desired image is formed by superposing respective color toner images in turn and a secondary transfer roller 1408 transfer the image onto a printing medium 1409. Furthermore, density sensors 1410 are arranged on the transfer belt 1407 between the neighboring primary transfer rollers, and each sensor can acquire density information of a preceding color toner image.

In this embodiment, assume that toners of the four colors are used, as described above. That is, the four photosensitive drums 1400, four charging rollers 1401, four laser light sources 1402, four reflection mirrors 1403, four developing rollers 1404, four primary transfer rollers 1405, and four cleaning brushes 1406 are arranged. Also, the three density sensors 1410 are arranged between the neighboring transfer rollers of the respective color toners. The number, types, and order of color toners can be arbitrarily determined in advance. For example, the engine mechanism unit 103 is configured so that color toner images are superposed on the transfer belt in an order of Y, M, C, and K. Furthermore, each density sensor 1410 is configured as an infrared sensor which receives a spectrum of an infrared range so as to be able to detect only the density of a Y color toner of C, M, and Y color toners. With this configuration, an identification mark is inserted in an inconspicuous Y color toner image, and is transferred onto the transfer belt first, thus allowing the three density sensors 1410 arranged between the neighboring transfer rollers of the respective color toners to detect this identification mark at any time. Note that the arrangement example of the engine mechanism unit 103 shown in FIG. 14 is simplified for the descriptive purpose of the present invention, and not all mechanisms associated with the print processes of the laser beam printer are illustrated. Also, FIG. 14 shows the arrangement of a tandem system, but other arrangements may be adopted.

Figure 15:
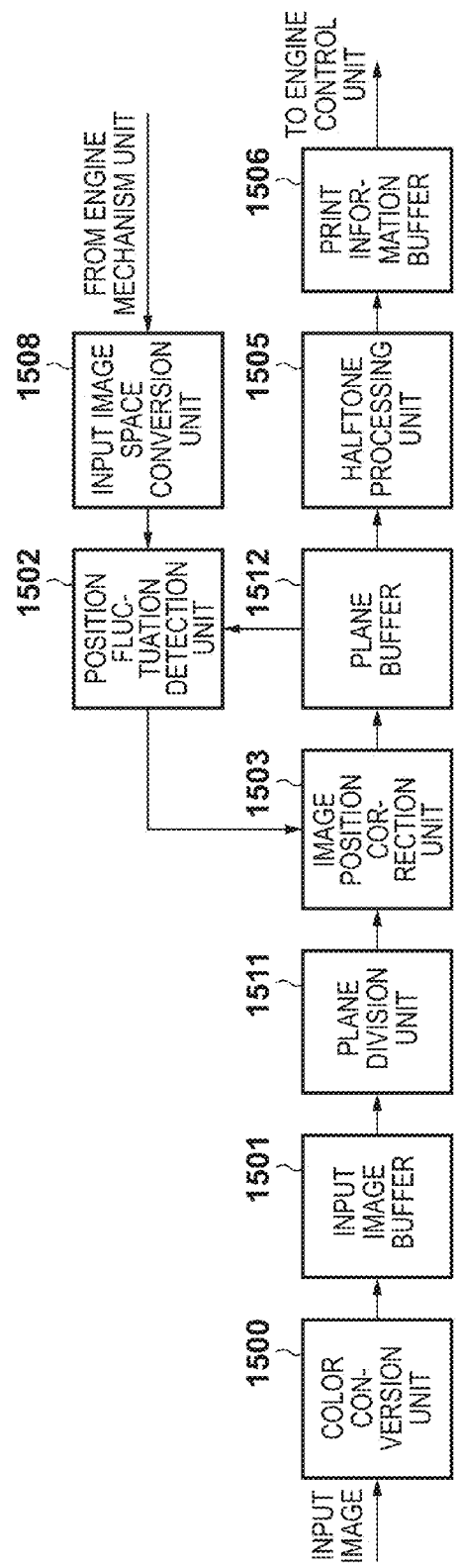
FIG. 15 is a block diagram showing a detailed arrangement example of an image processing unit.

FIG. 15 is a block diagram showing a detailed arrangement example of the image processing unit 101 according to the third embodiment. The image processing unit 101 executes processing for converting an input image into image data interpretable by the engine control unit 102. For this purpose, the image processing unit 101 includes a color conversion unit 1500, input image buffer 1501, position fluctuation detection unit 1502, image position correction unit 1503, halftone processing unit 1505, print information buffer 1506, and plane buffer 1512. These respective units are assigned to the CPU, memory, dedicated processing circuit, and the like, and respective processes may be implemented by software processing of the CPU or using a dedicated image processing circuit.

The color conversion unit 1500 converts input image data which is expressed by, for example, R, G, and B colors into that on a color space of toner colors such as C, M, Y, and K, which can be output by the laser beam printer. When LC (light cyan) and LM (light magenta) toners, and the like are used so as to extend the printable gamut of the laser beam printer, this color conversion unit 1500 may convert image data into respective toner colors.

The input image buffer 1501 prints the image data converted into the toner colors for each input image. An input image space conversion unit 1508 converts density information of a preceding color toner image acquired using the density sensor 1410 arranged on the transfer belt 1407 into that on an input image space. The density information of the preceding color toner image acquired by the density sensor 1410 is image data obtained by applying halftone processing to the input image data, inverse conversion of the halftone processing is executed as in the input image space conversion unit 908 in the second embodiment.

The position fluctuation detection unit 1502 detects a position fluctuation from the preceding color toner image by comparing the density information converted on the input image space and image information divided for each toner, which is called a plane image (or simply called a plane) required to generate the color toner image. A detection method in the third embodiment will be described below with reference to FIG. 16.

Figure 16:
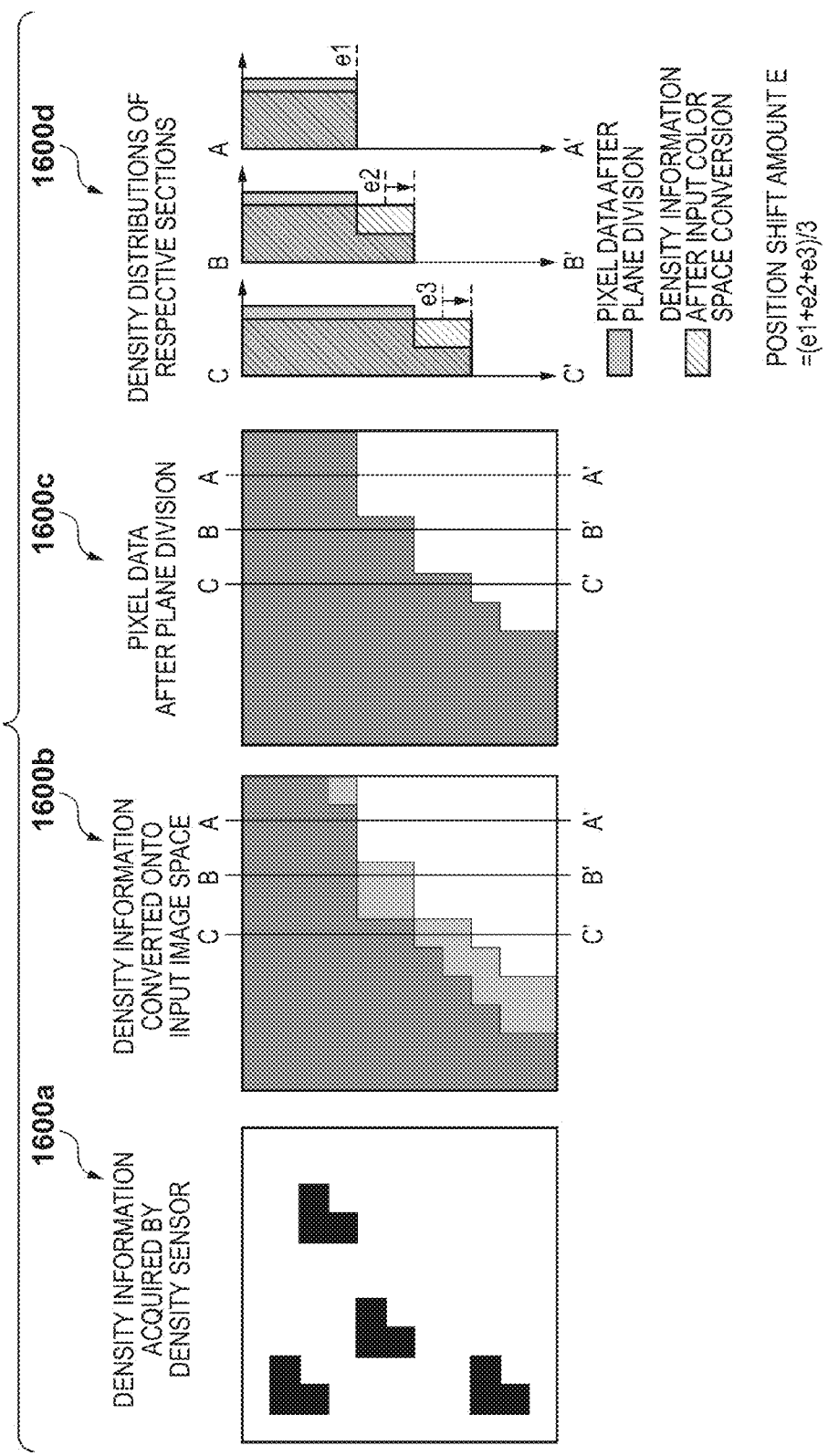
FIG. 16 is a view for explaining a position fluctuation detection method.

The density sensor 1410 acquires density information 1600*a* of specific regions or identification marks of the preceding color toner image, as shown in FIG. 16. Since the laser beam printer normally uses a halftone dot screen in which dots are periodically arranged in the halftone processing, dots each having a shape shown in FIG. 16 appear. The input image space conversion unit 1508 converts this density information into density information 1600*b*. This density information has the same number of tones as that of the input space, and undergoes inverse conversion of the halftone processing.

The image converted onto the input image space and plane image data 1600*c* stored in the plane buffer 1512 (to be described later) are compared. In this case, as denoted by reference numeral 1600*d*, the centers of edges of density distributions of sections A-A', B-B', and C-C' of the images 1600*b* and 1600*c* are detected, and differences of these portions are detected, thus detecting a position fluctuation. In this case, in order to calculate the position fluctuation more accurately, differences (three differences e1, e2, and e3 in FIG. 16) calculated at a plurality of positions are averaged to calculate a position fluctuation E. Note that the position fluctuation detection method of this embodiment is not limited to this, and an arbitrary method of calculating position fluctuation information based on the detected density information of a preceding toner color image and corresponding plane image data can be used.

The image position correction unit 1503 executes processing for displacing an input image based on the position fluctuation information detected by the position fluctuation detection unit 1502. As described in the first and second embodiments, the image position correction unit 1503 attains position correction of a pixel unit or less by interpolation processing.

The plane buffer 1512 stores image data corresponding to respective toner colors, which have undergone the position correction by the image position correction unit 1503, as plane images.

The halftone processing unit 1505 converts the input image data for respective toner colors, which are stored in the plane buffer, into those each of which artificially expresses halftones and has the number of tones smaller than that of the input image data, thus generating print data. In case of the laser beam printer, a print image is formed by superposing the respective color toner images generated by this halftone processing unit 1505. For this reason, halftone processing having characteristics in which areas of regions to be superposed remain unchanged even when a position fluctuation between color toner images has occurred is generally executed.

The print information of a certain toner color generated by the aforementioned processing is output to the engine control unit 102, and the engine mechanism unit 103 transfers that information onto the transfer belt 1407. Furthermore, the same processing is executed for the remaining toner colors, and pieces of print information of all the toner colors are superposed on the transfer belt 1407, and are transferred onto the printing medium 1409 using the secondary transfer roller 1408.

As described above, according to the third embodiment, position fluctuation information is calculated by detecting a preceding color toner image on the transfer belt using the density sensor. Based on the calculated position fluctuation information, pixel positions of an input image before the halftone processing are displaced. For this reason, unlike in the related art, an adjusting mechanism for adjusting an irradiation timing of each laser beam or moving each reflection mirror is not required, thus minimizing an increase in cost. Furthermore, when color toner images are printed in an order of K, Y, M, and C, and the density of a black (K) toner image is detected using each density sensor, density nonuniformity (density fluctuation) of the K toner can also be corrected using process black as a combination of C, M, and Y toners.

The fourth embodiment will be described below. As the fourth embodiment of the image forming apparatus according to the present invention, an ink-jet printer which performs multi-pass printing using four passes will be exemplified below. Especially, an example will be described wherein image information already printed on a printing medium is acquired using an image sensor added to a printer head, and position correction and density correction of next image information to be printed are executed. Note that the fourth embodiment is different from the second embodiment in the detailed arrangement of the image processing unit 101.

Figure 17:
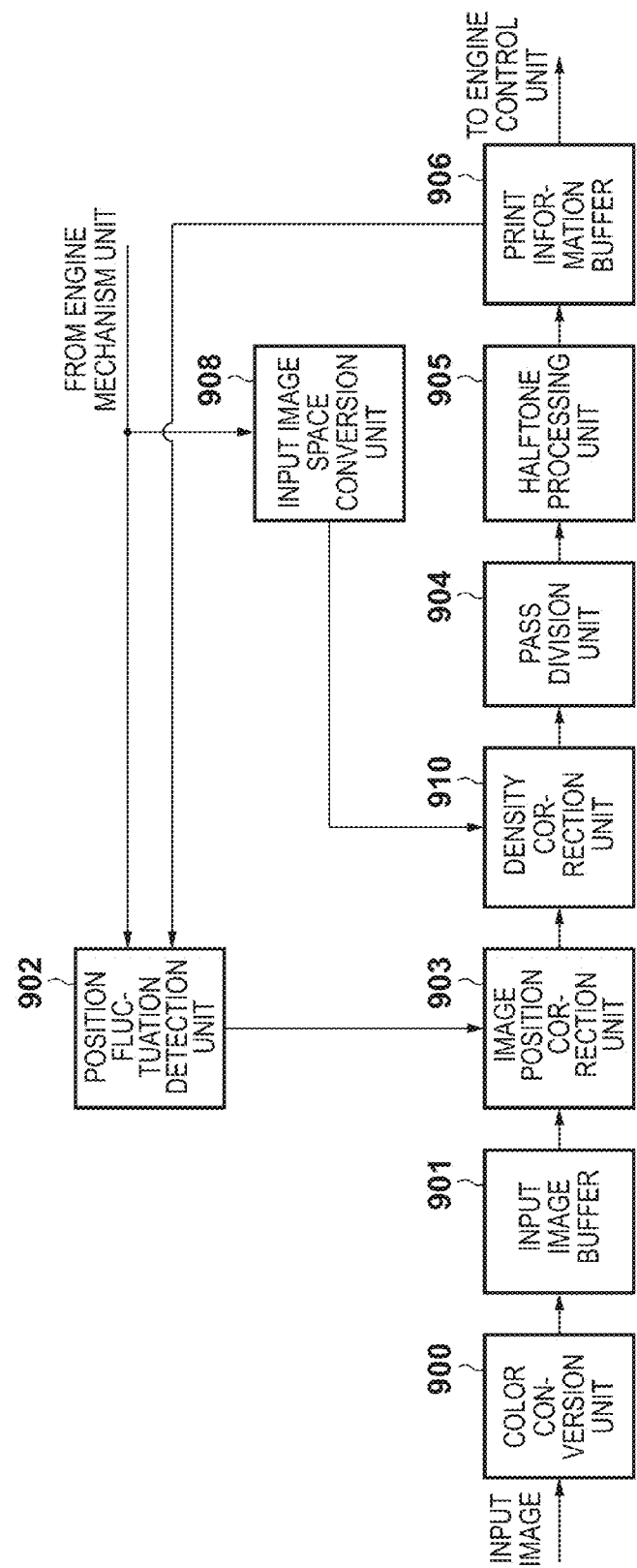
FIG. 17 is a block diagram showing a detailed arrangement example of an image processing unit.

FIG. 17 is a block diagram showing a detailed arrangement example of the image processing unit 101 according to the fourth embodiment. The processing order of a pass division unit 904 and a density correction unit 910 upon generation of next image information to be printed is different from the second embodiment.

In the aforementioned second embodiment, image information which has undergone position correction by an image position correction unit 903 is divided into respective pass images by the pass division unit 904. The density correction unit 910 subtracts a density nonuniformity amount detected by a difference detection unit 909 from these pass images, thereby correcting density nonuniformity included in the already printed image information. For this reason, an input image space conversion unit 908 which converts read image information into that on an input image space, an accumulated print information generation unit 907 which accumulates already printed images from the position-corrected images, and a difference detection unit 909 which detects density nonuniformity by detecting their difference are required.

On the other hand, in the fourth embodiment, image information which has undergone position correction by the image position correction unit 903 undergoes density correction by a density correction unit 910, and is then divided into passes by the pass division unit 904. By replacing the order of pass division and density correction in this way, density nonuniformity can be corrected if only an input image space conversion unit 908 which converts read image information into that on the input image space is available. For this reason, the accumulated print information generation unit 907 and difference detection unit 909 in the second embodiment (FIG. 9) are not required. This is because, in the density correction unit 910, image information (density fluctuation information) to be printed by subsequent passes can be generated by subtracting a total of pieces of image information (density values) which include density nonuniformity and have already been printed from the image information corrected by the image position correction unit. The image information to be printed in the subsequent passes is divided by the pass division unit 904 into pass images including the density nonuniformity correction amount and these pass images are printed.

At this time, coefficients to be multiplied by respective image data in case of pass division in the pass division unit 904 are preferably a combination of coefficients so that a sum total of image data distributed to respective pass images becomes equal to input image data. For example, in an example in which a predetermined coefficient assumes a value "1/(number of divided passes−pass number+1)", when the number of divided passes is "4", as shown in FIG. 6, w1=¼, w2=⅓, w3=½, and w4=1/1 are set, so as to equally distribute image data to respective passes. On the other hand, when w1=½, w2=½, w3=½, and w4=1/1 are set, calculations required to distribute image data are only 1-bit shift calculations, and a merit of reducing the calculation volume of the pass division unit 904 can be provided.

As described above, according to the fourth embodiment, image quality can be improved by the arrangement which is simpler and easier than the aforementioned second embodiment.

In the second embodiment, since density correction is attained by subtracting a density nonuniformity amount of the already printed image information from pass images, the effect of density correction is limited to the density range of the pass images. When density nonuniformity increases beyond the density range of the pass images, since a given pass is not printed at all, the effect of multi-pass printing is reduced. On the other hand, in the arrangement of the fourth embodiment, the already printed image information is subtracted from the entire image information to be printed, and image information to be printed in subsequent passes can be calculated. In this way, density correction can be attained as long as the already printed image information including density nonuniformity is not larger than image information to be printed. Since image information to be printed in subsequent passes is divided into passes, the multi-pass printing effect can always be obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-258287, filed Nov. 25, 2011, which is hereby incorporated by reference herein in its entirety.

What is claimed is:

1. An image processing apparatus for forming an image by executing N (N is an integer not less than 2) printing scans for a single region on a printing medium comprising:
    a readout unit configured to read out image data of a region corresponding to a printing scan of interest from input image data;
    a print data generation unit configured to generate print data which is used in the printing scan of interest and has the number of tones smaller than the number of tones of the input image data from the image data of the region read out by said readout unit by halftone processing; and
    an obtaining unit configured to obtain position fluctuation information,
    wherein the position fluctuation information indicates a position shift amount from an ideal position in a direction of conveyance of a printing medium for the printing scan of interest, and
    wherein said readout unit controls a readout position of the region corresponding to the printing scan of interest in accordance with the position fluctuation information.

2. The apparatus according to claim 1, wherein said readout unit displaces the readout position by the position fluctuation information with respect to a readout position free from any position fluctuation in the direction of conveyance.

3. The apparatus according to claim 1, wherein, if the position fluctuation information includes a decimal position fluctuation, said readout unit reads out the region after displacing the readout position, and then executes interpolation processing of the image data of the region in accordance with the position fluctuation information.

4. The apparatus according to claim 1, wherein said obtaining unit includes a detection unit configured to detect previously printed print data, and a calculation unit configured to calculate the position fluctuation information based on the detection result.

5. The apparatus according to claim 1, wherein said print data generation unit further applies density correction to the image data of the region.

6. The apparatus according to claim 1, wherein said image processing apparatus is an image processing apparatus for an image forming apparatus of an ink-jet scheme, which forms an image on the printing medium by multi-pass printing using N printing scans of a printer head.

7. The apparatus according to claim 1, wherein said print data generation unit generates the print data so as to decrease a density to be printed more in subsequent printing scans of the N printing scans.

8. The apparatus according to claim 1, wherein the position fluctuation information is a fluctuation amount mainly caused by a fluctuation of a conveyance amount of the printing medium.

9. The apparatus according to claim 1, wherein said obtaining unit reads an image printed by a printing scan immediately prior to the printing scan of interest using an image sensor, and obtains the position fluctuation information calculated based on a position shift amount between the read image and an image indicated by the print data of the printing scan immediately prior to the printing scan of interest.

10. The apparatus according to claim 9, wherein said obtaining unit further obtains density fluctuation information calculated based on a difference between a density indicated by an image which is printed until the printing scan immediately prior to the printing scan of interest and is read by the image sensor, and a total of density values of print data corresponding to printing scans until the printing scan immediately prior to the printing scan of interest, and
    said print data generation unit generates the print data of the region corresponding to the printing scan of interest so as to compensate for the difference.

11. The apparatus according to claim 9, wherein said the image sensor is added to a printer head.

12. The apparatus according to claim 1, wherein said obtaining unit reads a conveyance amount and obtains the position fluctuation information calculated based on a difference between the read conveyance amount and a target conveyance amount.

13. The apparatus according to claim 1, wherein said print data generation unit comprises:
    a halftone processing unit configured to apply halftone processing to the image data of the region read out by said readout unit; and
    a division unit configured to divide the image data which has undergone the halftone processing into N printing scans using a decimation pattern.

14. The apparatus according to claim 1, wherein said print data generation unit comprises:
    a division unit configured to divide the image data of the region read out by said readout unit into N printing scans; and
    a halftone processing unit configured to respectively apply halftone processing to image data corresponding to the printing scans divided by said division unit.

15. The apparatus according to claim 14, wherein said division unit divides image data into the respective printing scans according to feature amounts of the input image data.

16. The apparatus according to claim 1, wherein said readout unit extends, by adding a neighboring pixel line to a region which is to read out if there is no position fluctuation in the direction of conveyance, a region to be read out based on the position fluctuation information.

17. The apparatus according to claim 1, wherein said image processing apparatus is an image processing apparatus for an image forming apparatus which forms a color image by printing plane images of N colors using an electrophotography system, and
    said print data generation unit applies halftone processing to the image data of the region read out by said readout unit.

18. The apparatus according to claim 17, wherein said obtaining unit reads an image printed on a transfer belt by a printing scan immediately prior to the printing scan of interest, and obtains the position fluctuation information calculated based on a difference between the read image and an image indicated by the print data of the printing scan immediately prior to the printing scan of interest.

19. The apparatus according to claim 18, wherein said obtaining unit obtains the position fluctuation information calculated based on a difference between an image generated by applying inverse conversion of the halftone processing to the image which is printed on the transfer belt by the printing scan immediately prior to the printing scan of interest and is read by the sensor, and an image generated by the print data of the printing scan immediately prior to the printing scan of interest.

20. The apparatus according to claim 18, wherein said obtaining unit further obtains density fluctuation information calculated based on a difference between a density indicated by an image which is printed on the transfer belt until the printing scan immediately prior to the printing scan of interest and is read by the sensor and a total of density values of print data corresponding to printing scans until the printing scan immediately prior to the printing scan of interest, and
said print data generation unit generates print data of the region corresponding to the printing scan of interest so as to compensate for the difference.

21. A non-transitory computer-readable storage medium storing a computer program, the computer program controlling a computer to function as respective units of an image processing apparatus of claim 1.

22. The apparatus according to claim 1, wherein, if the position fluctuation information indicates a position shift amount equal to or more than a position shift amount corresponding to one pixel, said readout unit reads out a region, which consists of a combination of pixel lines different from a combination of pixel lines in a reference region which is to be read out if there is no position fluctuation in the direction of conveyance, as the image data.

23. The apparatus according to claim 22, wherein the readout unit stores pixel values of 0 for a pixel line which does not overlap the reference region.

24. The apparatus according to claim 1, wherein a region which is to be read out by the readout unit comprises regions corresponding to 1st through N-th-passes.

25. An image forming apparatus of an ink jet scheme, which forms an image on a printing medium by multi-pass printing using N printing scans of a printer head for a single region on the printing medium in a direction perpendicular to a direction of conveyance of the printing medium, comprising the apparatus according to claim 1,
wherein the printer head comprises a plurality of printing element arrays, each comprising a plurality of printing elements arranged in the direction of conveyance, and printing elements to be used for printing a region for each of 1st through n-th passes vary in accordance with the position fluctuation information.

26. The apparatus according to claim 25, wherein, for each printing scan, the printing elements to be used for printing a region for each of 1st through n-th passes vary in accordance with the position fluctuation information.

27. An image processing method for forming an image by executing N (N is an integer not less than 2) printing scans for a single region on a printing medium comprising the steps of:
a readout step of controlling a readout unit to read out image data of a region corresponding to a printing scan of interest from input image data;
a print data generation step of controlling a print data generation unit to generate print data which is used in the printing scan of interest from the image data of the region read out in the readout step by halftone processing; and
an obtaining step of controlling an obtaining unit to obtain position fluctuation information,
wherein the position fluctuation information indicates a position shift amount from an ideal position in a direction of conveyance of a printing medium for the printing scan of interest, and
wherein in the readout step, a readout position of the region corresponding to the printing scan of interest is controlled in accordance with the position fluctuation information.

* * * * *